(12) United States Patent
Bissantz

(10) Patent No.: US 7,861,148 B2
(45) Date of Patent: Dec. 28, 2010

(54) METHOD FOR DEFINING A BASE LINE

(76) Inventor: Nicolas Bissantz, Guentersbuehlerstrasse 40a, D-90491 Nuremberg (DE)

( * ) Notice: Subject to any disclaimer, the term of this patent is extended or adjusted under 35 U.S.C. 154(b) by 1166 days.

(21) Appl. No.: 11/496,118

(22) Filed: Jul. 31, 2006

(65) Prior Publication Data
US 2008/0030751 A1 Feb. 7, 2008

(51) Int. Cl.
*G06F 17/21* (2006.01)
(52) U.S. Cl. .................................. 715/200; 715/227
(58) Field of Classification Search .................. 715/200
See application file for complete search history.

(56) References Cited

U.S. PATENT DOCUMENTS 5,263,132 A * 11/1993 Parker et al. ................ 715/207
6,504,544 B1 * 1/2003 Hollingsworth et al. ..... 345/467

* cited by examiner

*Primary Examiner*—Doug Hutton
*Assistant Examiner*—Tionna Smith
(74) *Attorney, Agent, or Firm*—Dilworth & Barrese LLP.

(57) ABSTRACT

The present invention is directed to a method for defining a base line for a sparkline having vertical or horizontal bars representing positive and negative values of a set, with the bars representing negative values extending to one side of the base line and the bars representing positive values extending to the other side of the base line. The diagram is located in a space having two borders.

19 Claims, 3 Drawing Sheets

| N | Pos | Neg | Ratio | Mean (Ratio(N):Ratio(N-1)) | criterion |
|---|-----|-----|-------|----------------------------|-----------|
| 1 | 200 | 0 | | | all Values>=0 |
| 2 | 180 | 20 | 9,00 | 9,00 | 6,5<=RatioIn<9,0 |
| 3 | 160 | 40 | 4,00 | 6,50 | 3,17<=RatioIn<6,5 |
| 4 | 140 | 60 | 2,33 | 3,17 | 1,92<=RatioIn<3,17 |
| 5 | 120 | 80 | 1,50 | 1,92 | 1,25<=RatioIn<1,92 |
| 6 | 100 | 100 | 1,00 | 1,25 | 0,83<=RatioIn<1,25 |
| 7 | 80 | 120 | 0,67 | 0,83 | 0,55<=RatioIn<0,83 |
| 8 | 60 | 140 | 0,43 | 0,55 | 0,34<=RatioIn<0,55 |
| 9 | 40 | 160 | 0,25 | 0,34 | 0,18<=RatioIn<0,34 |
| 10 | 20 | 180 | 0,11 | 0,18 | 0<=RatioIn<0,18 |
| 11 | 0 | 200 | | | all Values<=0 |

| Example Values | Max | Min | Ratio | |
|----------------|-----|-----|-------|---|
| 18 | 18 | -3 | 6,00 | => Use of base line N = 3 |
| 14 | | | | |
| 5 | | | | |
| -3 | | | | |

METHOD FOR DEFINING A BASE LINE

BACKGROUND OF THE INVENTION

The present invention refers to a method for defining a base line for a sparkline comprising or consisting of vertical or horizontal bars wherein the bars represent positive and negative values of a set of values, wherein the bars representing negative values extend to one side of the base line and the bars representing positive values extend to the other side of the base line and wherein the diagram is located in a space having a first and a second border.

Sparklines are word-sized graphics which may be included into texts or tables and which depict high amounts of data in small spaces. For example, sparklines comprising upward and downward bars indicate current and historical business figures, like revenues or sales, stock quotes or wins and losses for example in soccer, tennis or baseball matches.

The length/height of the bars of the sparkline corresponds to the absolute values of a set of values on which the sparkline is based.

If the set of values on the basis of which a sparkline is to be created comprises positive and negative values of a predetermined time period the bars extend from the base line of a sparkline in two directions, in case of horizontal sparklines in the upward and downward direction. Similarly in case of vertical sparklines the bars extend from the base line to the right and left direction.

The available space for representing a sparkline is limited and may correspond to the height of a box of a table or to the line height of a line of a textual document. In any case the problem arises where to locate the base line from which the bars representing the sparkline extend.

SUMMARY OF THE INVENTION

Accordingly, it is an object of the present invention to provide a method for defining a base line for a sparkline so that the available space is utilized as far as possible.

This object is solved by a method comprising the steps of:
providing two or more than two lines into the space between the first and the second border,
determining for each of said lines a first value representing the distance between the respective line and the first border and a second value representing the distance between the respective line and the second border,
determining for each of said lines a first ratio between said first value and said second value,
determining a second ratio between the maximum and minimum absolute values of said set of values,
comparing the second ratio with the first ratios which have been determined for each of said lines or with values based on said first ratios and
selecting one of the lines as the base line on the basis of this comparison.

Accordingly, the method in accordance to the present invention comprises providing of two and more than two potential base lines into the available space between the first and second border which define the maximum available space for representing the sparkline.

The two or more than two possible base lines are preferably located in the space so that the space is separated into a number of equal intervals. In other words, the distance between two neighbouring lines and between said first border and the neighbouring line and the second border and the neighbouring line are preferably equal to each other.

After providing a suitable number of lines into the space between the first and second border for each of said potential base lines a first value representing the distance between the line and the first border and a second value representing the distance between the line and the second border is determined.

These first and second values are divided so that a first ratio is obtained for each of the potential base lines.

For example, if a potential base line exactly separates the available space between the first and the second border into equal portions the first value and the second value are equal so that the first ratio is 1. However, for every other line which is located closer to the first or to the second border than to the other border this ratio will be >1 or <1.

Further, the method comprises determining a second ratio between the absolute values of the maximum and minimal value of the set of values. If for example the set of values is composed of the numerical values −3, +5, +14, +18 then the method determines the ratio between 18 and 3 as the second ratio.

Thereafter, the thus obtained second ratio is compared with the first ratios which have been determined for each of said potential base lines or with a value based on said first ratios.

On the basis of this comparison the base line is selected from which the bars of the sparkline extend in two directions. The dimension of the bars corresponds to the numerical value underlying the respective bar.

In a preferred embodiment of the present invention the method further comprises determining the mean value between the first ratios for respective neighbouring potential base lines, comparing said second ratio with said mean values and selecting the base line on the basis of this comparison. If for example the first ratio for a potential base line is 4.0 and the first ratio for a neighbouring potential base line is 2.33, the mean value is approximately 3.17.

This mean value or a value based thereon is then compared with the second ratio which is determined based on the data set by dividing the maximum absolute value with the minimum absolute value of the set of values.

Further, the method may comprise preparing intervals each having two borders, wherein the borders are formed by said first ratios and/or by said mean values of neighbouring base lines, determining to which of said intervals the second ratio belongs and selecting the base line on the basis of this determination.

According to this embodiment of the invention intervals are formed wherein the borders of the intervals are represented by said mean values and/or by said first ratios. After preparing such interval for each of said potential base lines the second ratio is compared with the intervals. The interval into which the second ratio is falling is determined and the line is selected as base line which corresponds to the interval.

In accordance to a further embodiment of the present invention, a maximum numerical value is assigned to the distance between the first and the second border. Each of said potential base lines which are provided between the first and second borders is assigned two numerical values which are smaller than the maximum numerical value and which are proportional to the distance between the potential base line and the first and second border of the space, respectively. Said first ratio is the ratio between said two numerical values.

For example, the distance between the first and the second border of the interval is assigned the numerical value of 200 which corresponds to the maximum distance. This embodiment of the invention provides that each of said potential base lines is assigned a first numerical value which corresponds to the distance between the line and the first border and a second numerical value which corresponds to the distance between the line and the second border. For example, if the sparkline has vertical bars the lower border of the available space for representing the spark line is assigned the pair of values 0, 200. The top line of the available space is assigned a pair of values 200, 0. If for example, the interval is separated into ten equally spaced intervals than the distance between two neighbouring potential base lines is the numerical value of 20. Accordingly, the first line from the bottom has the pair of values 20, 180, the second line 40, 160, etc.

Thus, the pair of values represents the position of the base line within the space which is limited by the first and second borders.

Thereafter, the ratio between said two values is determined for each of the possible base lines and the second ratio is compared with these first ratios or with any other data based thereon.

In accordance to a further embodiment of the present invention, each of the vertical or horizontal bars is represented by a single symbol.

The present invention further is directed to a method for defining a base line for sparklines comprising or consisting of vertical or horizontal bars wherein the bars represent positive and negative values or of a set of values, wherein the bars representing negative values extend to one side of the base line and the bars representing positive values extend to the other side of the base line and wherein the diagram is located in a space having a first and a second border, the method comprising the steps of:

determining the difference between the maximum and minimum absolute values of said set of values in order to obtain a difference value, dividing the distance between the first and second border or a value representing said distance by the difference value in order to obtain a distance value representing the numerical value "1", multiplying the absolute minimum and/or the maximum value with said distance value and locating the base line at the top of the bar representing the minimum value and/or at the bottom of the bar representing the maximum value.

If for example the set of values on the basis of which a sparkline is to be created is again −3, +5, +14, +18 then the method determines the difference between 18 and 3 to obtain the difference value of 21.

If for example the distance between the first and second border is 42 mm then the method proceeds in dividing 42 mm/21 in order to obtain the distance value of 2 mm/1 which in other words clarifies that the numerical value of "1" is assigned a distance value of 2 mm.

Thereafter the method calculates the distance value of 6 mm for the numerical value "−3" and/or the distance value of 36 mm for the numerical value "18" and the base line is set at the top of the bar being located on and extending upwardly from the lower border of the space and representing the value "−3" and/or at the bottom of the bar being located at and extending below the upper border of the space and representing the value "18". The same method correspondingly applies for sparklines having horizontal bars.

The space between the first and second border may be separated by cells, wherein the value representing the distance between the fist and second borders is the number of cells located between the first and second borders of the space and wherein each bar is assigned the number of cells which corresponds to the absolute value which is represented by said bar. Accordingly, the space between the cells may be represented by a distance value such as 42 mm or by a number of cells or other items separating the space into intervals. If the height of each cell is 1 mm and the difference value is 21 as in the previous example the distance value is 2 cells/1 which in other words clarifies that the numerical value of "1" is assigned a distance value of 2 cells.

Each cell may be represented by a symbol and the second and any further cell of a bar is relocated to be positioned in case of vertical bars above or below the first cell and in case of horizontal bars besides the first cell so that the bar is represented by a single vertical or horizontal line and not by a step like representation of cells which are located diagonally with respect to each other.

In accordance to this method, each bar is assembled by a number of cells which number corresponds to the numerical value underlying the bar which is to be represented. If for example the available space between the first and second border of the space is separated into 100 cells a bar which is to represent a numerical value of 10 has a height of 10 cells.

According to this method the available space between the first and second border of the space is completely filled so that the space is exploited optimally. However, a drawback is that the number of characters which is to be provided for representing the bars is relatively high because each bar may be composed of a plurality of characters.

BRIEF DESCRIPTION OF THE DRAWINGS

Further advantages and details of the present invention become evident from the following example which is shown in the figures.

DESCRIPTION OF THE PREFERRED EMBODIMENTS

Figure 2:
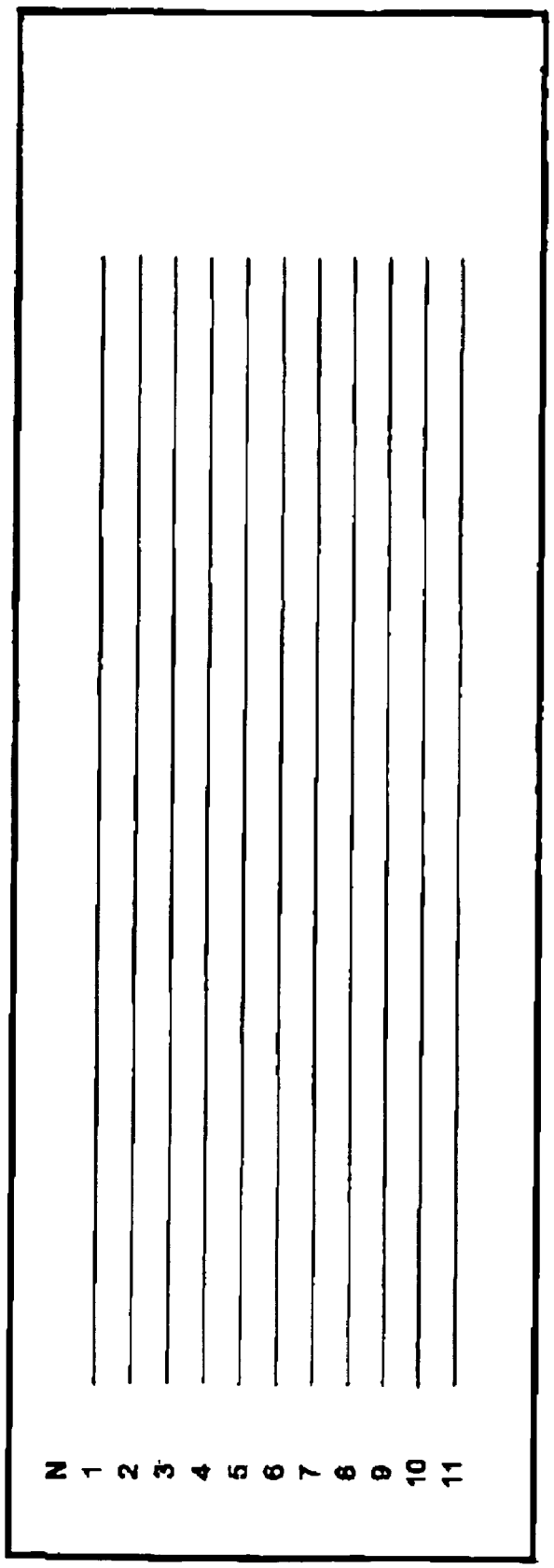
FIG. 2 represents the separation between a first and a second border line by equally spaced potential base lines.
Figure 3:
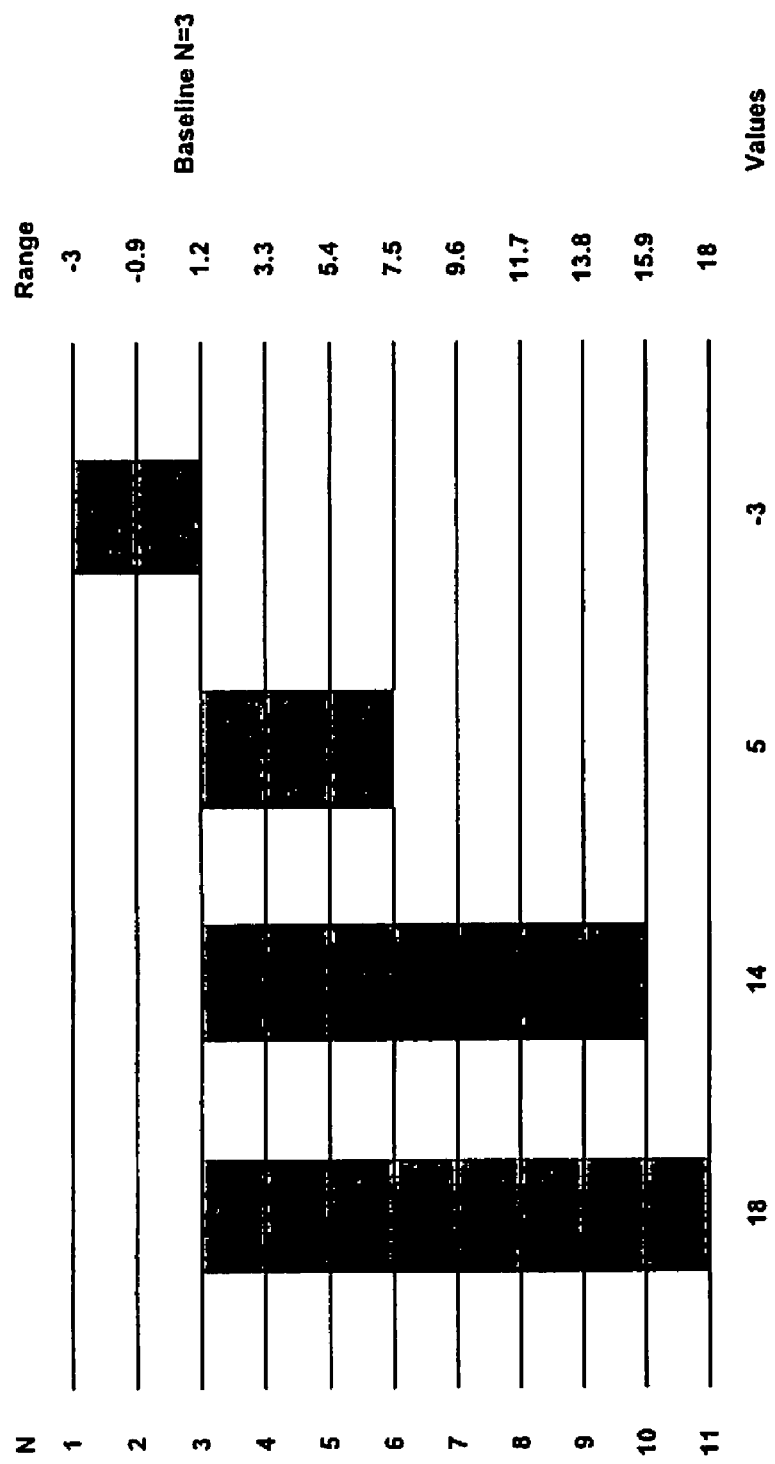
FIG. 3 represents the defined baseline for the sparkline.

FIG. 2 shows the first border 1 and the second border 11 of a space which is available for representing a sparkline.

The first, upper border is assigned the line number 1 and the lower second border is assigned the line number 11. The available space between the lines 1 and 11 is separated by nine additional potential base lines which are assigned the numbers 2-10 as may be evident from FIG. 2.

In addition, each potential base line is assigned a position-value as follows:

The distance between lines 1 and 11 is assigned the numerical value of for example 200. Of course any other value would also be conceivable. Since the potential base lines separate the available space between the first 1 and the second border 11 lines into 10 equal intervals, each interval corresponds to a numerical value of 20.

For each of the lines 1-11 or at least for potential base lines 2-10 a pair of values is determined as follows: A first value represents the distance between the respective line and the first border. The second value represents the distance between the respective line and the second border of the available space. Accordingly, since line 1 is representing the first border the distance between this line and the first border is 0. The distance between line 1 and the second border which is represented by line 11 is for example 200 due to the fact that the distance corresponds to the maximum distance between the first and second borders which has been assigned the numerical value of 200. Accordingly, the pair of values for line 1 is 0; 200.

As regards the lower line 11 which is the second line of the space the distance to the first line 11 is 200 and the distance to the second line which is represented by line 11 is 0. Accordingly, the pair of values for line number 11 is 200; 0.

It is of course also possible to change the order is the values so that the pair of values for line 1 would be 200; 0 and for line 11 0; 200.

Figure 1:
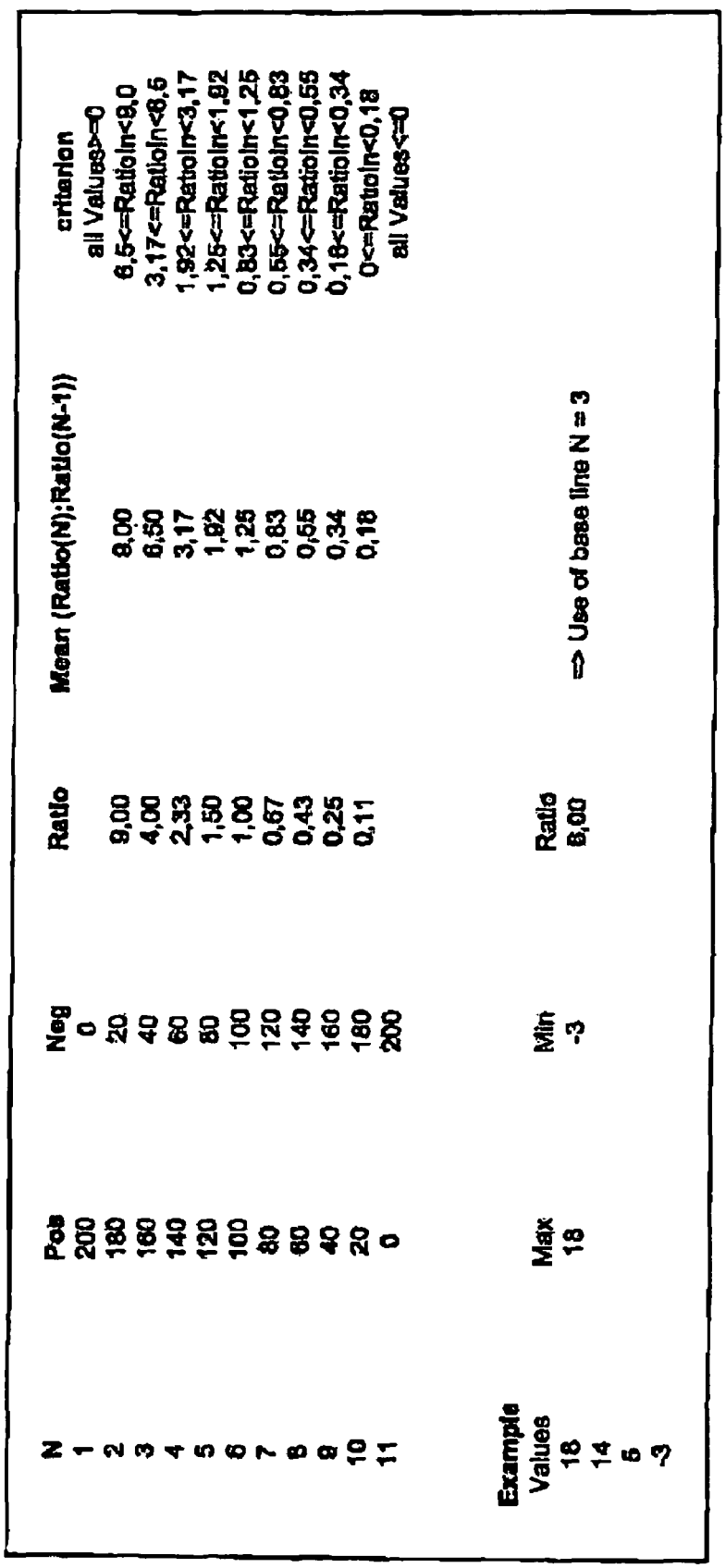
FIG. 1 represents an example for determining a base line.

As is further shown in the table of FIG. 1 this method of performed for each of potential base lines 2-10.

For example for line number 2 the distance between this line and the first line which is line 1 is 20 and the distance between line number 2 and the lower line which is line 11 is 180. Correspondingly, the value pair for line number 2 is 20; 180 or 180; 20.

Thereafter the method calculates the ratio of the two numerical values (which for example in case of line 2 is 180/20=9) for each of said lines 2-10. This method is repeated for all potential base lines 2-0 as is shown in FIG. 1 in the column "Ratio".

Thereafter, the mean value between the ratios of two neighbouring potential base lines is formed beginning with line number 3. Correspondingly, the value 6.5 assigned to line number 3 is the mean value between the ratio for line number 2 and line number 3. No such value can be formed for line number 2 because the ratio for line number 1 does not exist. This method is repeated for each potential-base line 2-10.

Based on these mean values for each of the potential base lines 2-10 an interval is formed wherein the upper border of each interval corresponds to the mean value for this line and the lower value corresponds to the mean value of the neighbouring line. For example for line number 2 the mean value is 9.0 and for line number 3 the mean value is 6.5. Accordingly, the interval for line number 2 is 6.5-9.0. The formation of intervals is repeated for each of the potential base lines 2-10.

Thereafter, the data set on the basis of which a sparkline shall be created is examined wherein in the present example the data set is comprised of the values –3, 5, 14, 18. According to the method according to claim 1 of the invention the ratio between the absolute values of the maximum and minimum value, i.e. between 18 and 3 is formed which is 6.0. Thereafter, it is examined into which of the intervals formed for each of the potential base lines this ratio of 6.0 is falling which in the present case is obviously the ratio between 3.17 and 6.5.

Accordingly, line number 3 is selected as a base value for representing the sparkline.

The invention claimed is:

1. Method for defining a base line for a sparkline comprising vertical or horizontal lines wherein the lines represent positive and negative values of a set of values, the lines representing negative values extend to one side of the base line and the lines representing positive values extend to the other side of the base line and the sparkline is located in a space having a first border (1) and a second border (11), comprising the steps of:
providing two or more lines (2-10) into the space between the first (1) and the second border (11),
determining for each of said lines (2-10) a first value representing the distance between the respective line (2-10) and the first border (1) and a second value representing the distance between the respective line (2-10) and the second border (11),
determining for each of said lines (2-10) a first ratio between said first value and said second value,
determining a second ratio between the maximum and minimum absolute values of said set of values,
comparing the second ratio with the first ratio which have been determined for each of said lines (2-10) or with values based on said first ratio, and
selecting one of the lines (2-10) as the base line on the basis of this comparison.

2. Method according to claim 1, wherein the method further comprises determining the mean value between the first ratio of each said lines and of the respective neighbouring lines (2-10), comparing said second ratio of said maximum and minimum values with said mean values and selecting one of the lines (2-10) as the base line on the basis of this comparison.

3. Method according to claim 1, wherein the method further comprises preparing intervals each having two borders, the borders of the intervals are formed by said first ratio of each said line and/or by said mean values of neighbouring lines (2-10), determining to which of said intervals the second ratio of said maximum and minimum values belongs and selecting the line (2-10) as the base line on the basis of this determination.

4. Method according to claim 1, wherein a maximum numerical value is assigned to the distance between the first border (1) and the second border (11) and each of said lines (2-10) which are provided between the first border (1) and the second border (11) is assigned two numerical values which are smaller than the maximum numerical value and which are proportional to the distance between the respective line (2-10) and the first border (1) and the second border (11) of the space, respectively, and said first ratio of each said line is the ratio between said two numerical values.

5. Method according to claim 1, wherein each of said vertical or horizontals lines bars is represented by a single character.

6. Method for defining a base line for a sparkline comprising or consisting of vertical or horizontal lines wherein the lines represent positive and negative values of a set of values, the lines representing negative values extend to one side of the base line and the lines representing positive values extend to the other side of the base line and the sparkline is located in a space having a first and a second border, comprising the steps of:
determining the difference between the maximum and minimum absolute values of said set of values in order to obtain a difference value, dividing the distance between the first and second border or a value representing said distance by the difference value in order to obtain a distance value representing the numerical value "1", and
multiplying the absolute minimum and/or the maximum value with said distance value and locating the base line at the top of the line representing the minimum value and/or at the bottom of the line representing the maximum value.

7. Method according to claim 6, wherein the space between the first and second border is separated by cells, the value representing the distance between the first and second border is the number of cells located between the first and second border of the space and each line is assigned the number of cells which corresponds to the absolute value which is represented by said line.

8. Method according to claim 7, wherein each cell is represented by a character and the second and any further cell of a line is relocated to be positioned in case of vertical lines above or below the first cell and in case of horizontal lines besides the first cell so that the line is represented by a single vertical or horizontal line.

9. Method according to claim 2, wherein the method further comprises preparing intervals each having two borders, the borders of the intervals are formed by said first ratio of each line and/or by said mean values of neighbouring lines (2-10), determining to which of said intervals the second ratio of said maximum and minimum values belongs and selecting the line (2-10) as the base line on the basis of this determination.

10. Method according to claim 9, wherein a maximum numerical value is assigned to the distance between the first border (1) and the second border (11) and each of said lines (2-10) which are provided between the first border (1) and the second border (11) is assigned two numerical values which are smaller than the maximum numerical value and which are proportional to the distance between the respective line (2-10) and the first border (1) and the second border (11) of the space, respectively, and said first ratio is the ratio between said two numerical values.

11. Method according to claim 2, wherein a maximum numerical value is assigned to the distance between the first border (1) and the second border (11) and each of said lines (2-10) which are provided between the first border (1) and the second border (11) is assigned two numerical values which are smaller than the maximum numerical value and which are proportional to the distance between the respective line (2-10) and the first border (1) and the second border (11) of the space, respectively, and said first ratio is the ratio between said two numerical values.

12. Method according to claim 3, wherein a maximum numerical value is assigned to the distance between the first border (1) and the second border (11) and each of said lines (2-10) which are provided between the first border (1) and the second border (11) is assigned two numerical values which are smaller than the maximum numerical value and which are proportional to the distance between the respective line (2-10) and the first border (1) and the second border (11) of the space, respectively, and said first ratio is the ratio between said two numerical values.

13. Method according to claim 12, wherein each of said vertical or horizontals lines is represented by a single character.

14. Method according to claim 2, wherein each of said vertical or horizontals lines is represented by a single character.

15. Method according to claim 3, wherein each of said vertical or horizontals lines is represented by a single character.

16. Method according to claim 4, wherein each of said vertical or horizontals lines is represented by a single character.

17. Method according to claim 9, wherein each of said vertical or horizontals lines is represented by a single character.

18. Method according to claim 10, wherein each of said vertical or horizontals lines is represented by a single character.

19. Method according to claim 11, wherein each of said vertical or horizontals lines is represented by a single character.

* * * * *